United States Patent [19]
Bokor et al.

[11] Patent Number: 5,156,420
[45] Date of Patent: Oct. 20, 1992

[54] ADJUSTABLE PIPE BEND WITH ELECTROFUSION FACILITY

[75] Inventors: Shaun D. Bokor, Leicestershire; Alan J. Dickinson, Nottingham, England

[73] Assignee: Uponor B.V., Netherlands

[21] Appl. No.: 758,329

[22] Filed: Aug. 28, 1991

Related U.S. Application Data

[63] Continuation of Ser. No. 461,094, Jan. 4, 1990, abandoned.

[30] Foreign Application Priority Data

Feb. 13, 1989 [GB] United Kingdom ............... 8903223

[51] Int. Cl.$^5$ ............................................. F16L 47/02
[52] U.S. Cl. ..................................... 285/21; 285/184; 285/423
[58] Field of Search ................... 285/21, 184, 423; 219/535, 544

[56] References Cited

U.S. PATENT DOCUMENTS

| | | | |
|---|---|---|---|
| 2,731,933 | 6/1956 | Phillips | 113/111 |
| 3,238,346 | 3/1966 | Savko | 219/10.53 |
| 3,378,672 | 4/1968 | Blumenkranz | 219/200 |
| 4,627,646 | 12/1986 | Kessel | 285/114 |
| 4,630,846 | 12/1986 | Nishino et al. | 285/21 |
| 4,851,647 | 6/1989 | Kuhling | 219/535 |
| 4,906,313 | 3/1990 | Hill | 156/158 |
| 4,932,257 | 6/1990 | Webb | 285/21 X |

FOREIGN PATENT DOCUMENTS

| | | |
|---|---|---|
| 0341494 | 4/1989 | European Pat. Off. |
| 805469 | 5/1951 | Fed. Rep. of Germany ...... 285/184 |
| 2641504 | 3/1970 | Fed. Rep. of Germany . |
| 2325757 | 12/1973 | Fed. Rep. of Germany . |
| 2306642 | 5/1974 | Fed. Rep. of Germany . |
| 2500297 | 12/1975 | Fed. Rep. of Germany . |
| 1116612 | 6/1968 | United Kingdom . |

Primary Examiner—Dave W. Arola
Attorney, Agent, or Firm—Oliff & Berridge

[57] ABSTRACT

An adjustable pipe bend which has at least two parts joined by flanges (10, 10a) which incorporate an electrical fusion element in the form of a plastic annular disc (15) with a heater wire (16) located at or adjacent both surfaces of the disc.

A number of embodiments of the invention illustrate different adjustable bends, the arrangement being that the bend is adjusted to a required position and then the heater wire has a voltage applied to it to produce a heating current which causes the plastic annular disc and adjacent plastic faces of the flanges to melt sufficiently to cause fusion between the two parts of the pipe.

7 Claims, 4 Drawing Sheets

ADJUSTABLE PIPE BEND WITH ELECTROFUSION FACILITY

This application is a continuation of application Ser. No. 07/461,049 filed Jan. 4, 1990, now abandoned.

BACKGROUND OF THE INVENTION

Pipe systems for underground gas and water distribution are assembled and fused in-situ. Changes in direction are common in underground installations. Minor changes can be accommodated by the inherent flexibility of the pipe, while major changes are currently effected by a range of molded or formed fixed angle bends. The molded or formed bends are fused into the system to maintain a consistent and fully sealed system.

One form of existing bend involves cutting two pipe ends at the same angle and fusing two such cuts together. This forms an angle that is twice the cut angle of each pipe end, providing a mitred joint. Bends fabricated by this angle cut and butt fuse process tend not to have good flow characteristics and they are considered not to have the same strength as the pipe system from which they are formed.

In many situations the molded fixed angle bends do not provide the appropriate degree of directional change. In this situation several bends must be assembled together or extra strain must be placed on the pipe and jointing to accommodate the change in direction. These factors make it difficult to complete the system without resorting to alternative materials which involve transitions and often non-fused elements.

An adjustable bend that could be set at the required angle and then fused would provide benefits in that it would enable fewer components to be used, it would reduce the strain on other components and it would maintain a consistent and fully fused system.

To maintain the flow properties of the pipe system it is also important that a large loss in pressure head does not occur as the fluid flows through the bend. To avoid a significant loss in pressure the adjustable bend must create a smooth change in direction and provide a consistent bore profile at whatever angle it is set.

An objective of the invention is to form an adjustable bend which may be made, for example, in medium density polyethylene (MPDE) which can be readily set to the required angle during installation, the relatively movable parts being then fusable to complete a low pressure loss bend of the required angle, which may then form part of a fully fusion sealed pipe system.

SUMMARY OF THE INVENTION

According to the present invention, there is provided an adjustable pipe bend comprising two relatively movable pipe parts adapted to be set at any angle to each other within a predetermined range, means being provided at the junction of the two parts to fuse the parts together when they have been set at a required angle.

Preferably the fusion means comprises an electrical heating element, and especially one which is located in or between mating flanges carried by the two parts.

DETAILED DESCRIPTION OF THE INVENTION

The central concept of the present invention is to have flanges set at an angle to the pipe so that when two of these flanges are rotated relative to each other a variation in angle occurs.

To obtain such a bend with the minimum number of parts and a maximum angular potential, i.e. 0 to 90 degrees from straight, the centerline axes of the pipe spigots must meet at the center of rotation of flanges set at 45 degrees. Unfortunately, if the bores of the mating parts are taken straight up to the intersect a large interfacing diameter and a sharp intersection edge are created. These effects lead to a large overall fitting diameter and a high pressure loss.

The alternative is to maintain the bore size through the fitting by creating a curve into the flange and allowing the intersect of the pipe axis to move off the centre line of flange rotation. If a two component 90 degree bend is attempted in this format the offset and skew between the spigots at intermediate angles will be very large, therefore a 45 degree maximum bend has been chosen as the base system.

Figure 1:
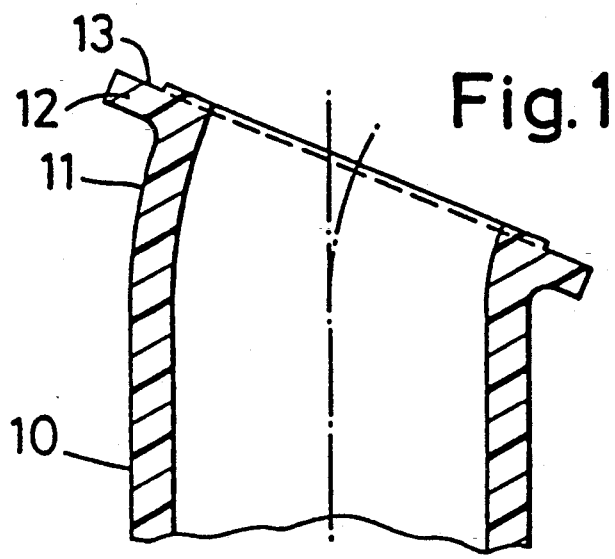
FIG. 1 is a cross-sectional view of one component of an adjustable pipe bend of the present invention.

The system will comprise of several PE moldings. Two of these moldings will normally be identical in any one total bend assembly. The duplicated moldings take the form of a pipe spigot 10 which is extended around a curve 11 and terminated in a flange 12 which forms an angle to the pipe axis as shown in FIG. 1. When two such parts 10, 10a are placed flange to flange with the curve maintained as a continuous arc they form a bend whose included angle from a straight pipe is twice the change of angle of each individual component.

Figure 2:
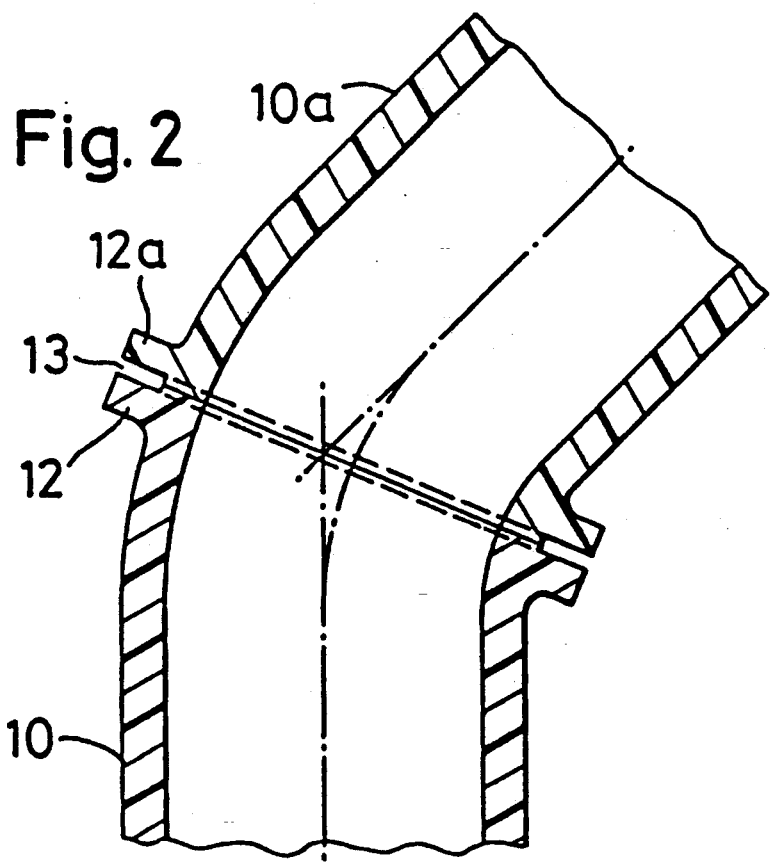
FIG. 2 is a cross-sectional view of two of the components illustrated in FIG. 1, joined to form the maximum angle of bend of the system.

FIG. 2 shows the combined components. If the components in FIG. 2 are rotated relative to each other the angular change is reduced until at 180 degrees relative movement it becomes zero, although an offset in the pipe axis remains. The skew and offset that are developed as the parts rotate relative to each other is not thought to be detrimental to the fittings performance.

The flanges 12, 12a are recessed at 13 to receive a fusion element.

Figure 3:
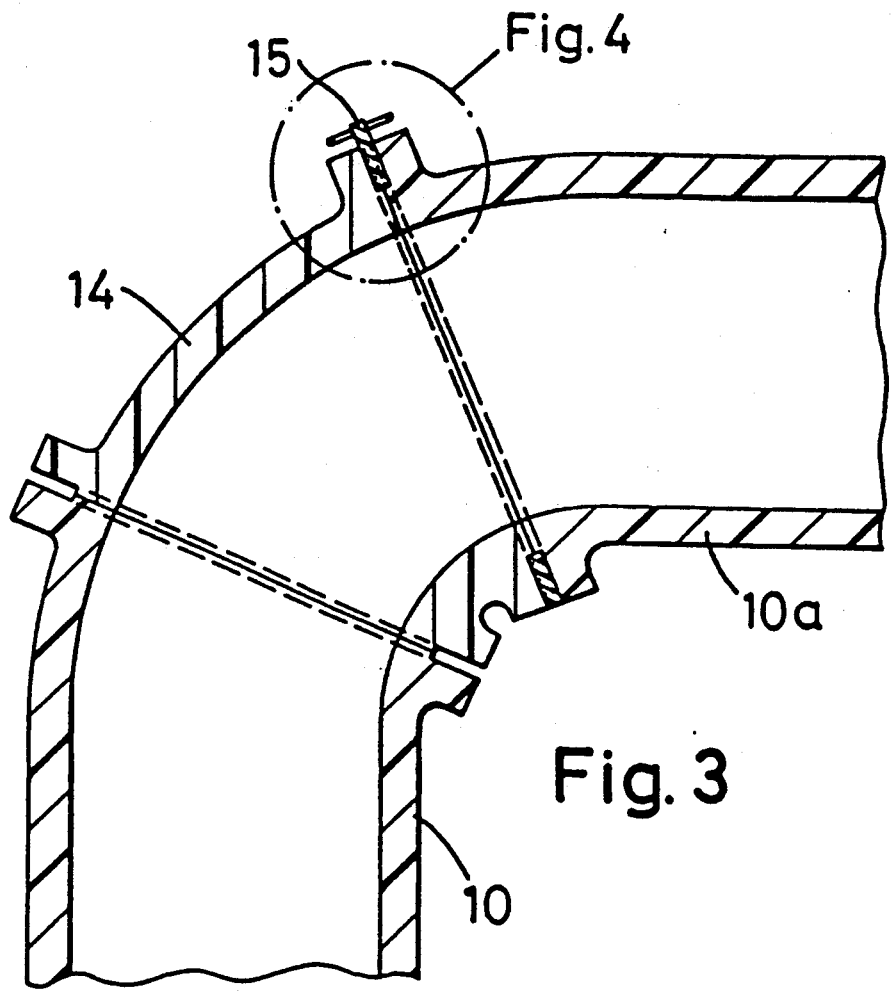
FIG. 3 is a cross-sectional view of another embodiment of the present invention, comprising an additional component to increase the angular range and avoid skew and offsets.
Figure 4:
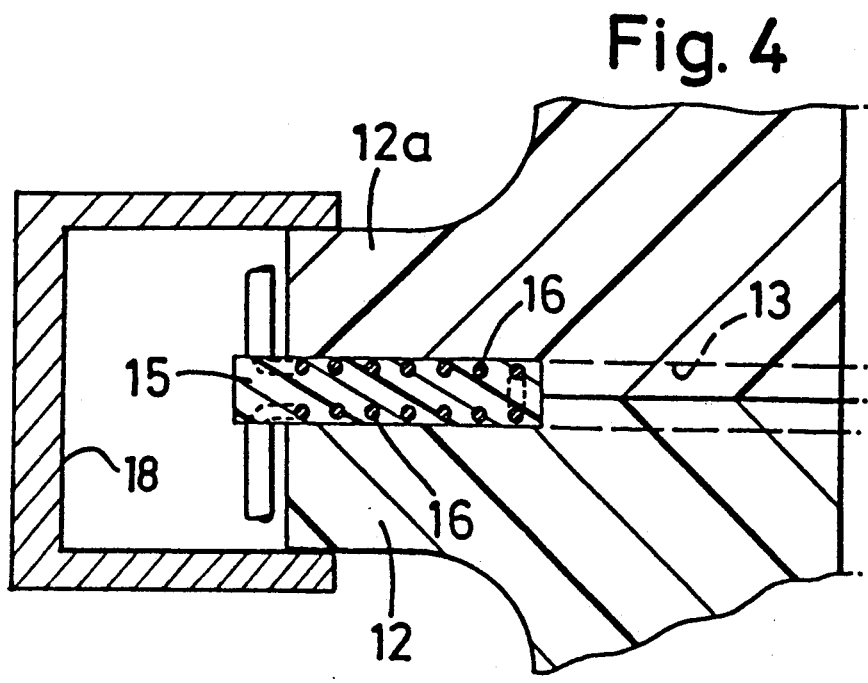
FIG. 4 is a cross-sectional view of another embodiment of the present invention, comprising a butt fusion element of the type shown in European Patent Application Number 87103165.4, used to fuse two components of a pipe bend.

FIG. 3 illustrates the inclusion of another component 14, by means of which it is possible to maintain the low pressure loss curved bore of the system while extending the angular capability of the bend. The configuration in FIG. 3 also eliminates any skew and offset provided that only the center component 14 is rotated relative to the two outer components. A disadvantage is the extra complexity, extra components and extra fusion joints.

Where any two of the component parts meet at a flange, some location must be provided so that the parts rotate about the correct axis and so that no step occurs in the smooth curve of the bore. A fusion element is also needed to provide a fully sealed system. To provide for both location and fusion a butt fusion ring is used. The location of the ring is shown in FIG. 4. The ring will be of a larger size than the fitting's nominal size. Details of the ring can be found in European patent No. 87103165.4 owned by Riesselmann & Sohn, but basically it consists of plastic annular disc 15 with a heater wire 16 located at or adjacent both surfaces of the disc and terminals to which wiring can be attached to supply heater current.

Figure 5:
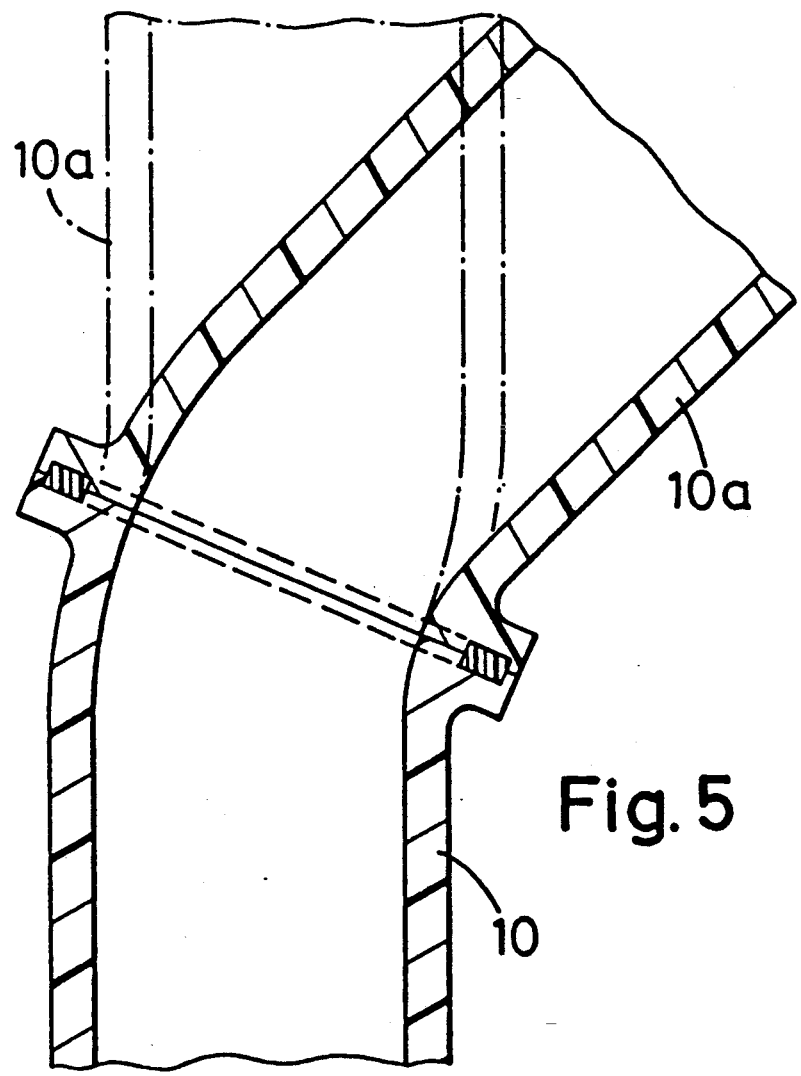
FIG. 5 is a cross-sectional view of another embodiment of the present invention, illustrating the complete 0 to 45 degrees adjustable bend shown in firm line in one position and in dotted line in an adjusted position.

In FIG. 5, the 0–45 degree adjustable bend, or radiused elbow, is illustrated with the bend being shown in its extreme positions with adjustment. Portion 10a is rotated relative to portion 10 from the firm line position shown to a dotted line position thus changing the bend angle through a 45 degree maximum.

It will be noted that in all positions the bend follows the smooth transition from part 10 to part 10a.

Figure 6:
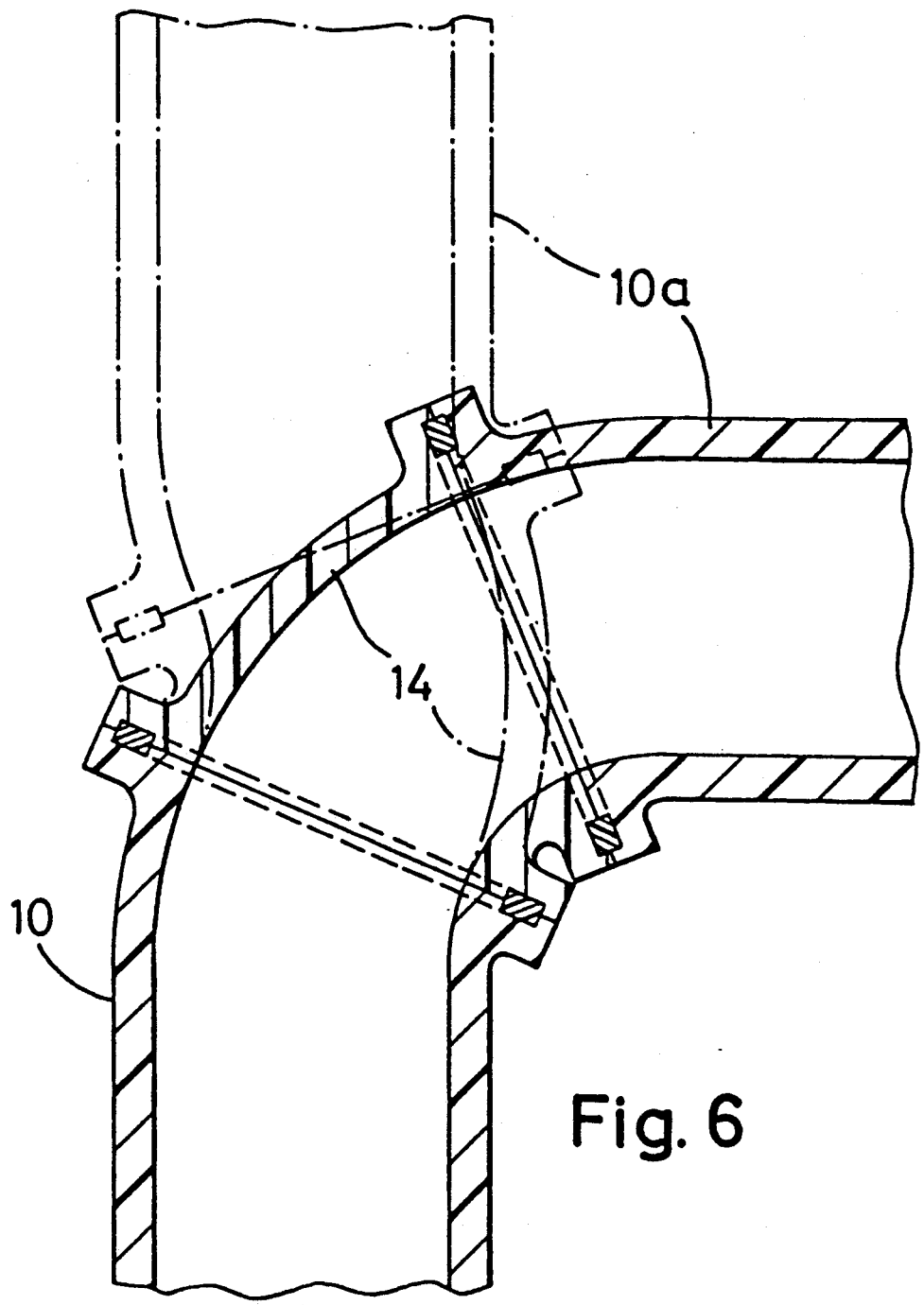
FIG. 6 is a cross-sectional view of the embodiment of FIG. 3, illustrating two different positions of the adjustable bend.

FIG. 6 illustrates, in a similar manner, a full 0–90 degree adjustable bend using same parts 10 and 10a but with the additional center portion 14 which enables the pipe to be adjusted for a full 90 degrees while again retaining smooth flow through the pipe joint in all positions. Again the extremes of adjustment shown would be parts 10a and 14 shown in their unadjusted position in firm lines and at extremes of adjustment of the parts in dotted lines.

The heating or fusion element may be in the form of a fusion element consisting of an annular ring of plastic material with a heater wire embedded in or partially embedded in one or both surfaces of the element.

Any other form of electrofusion element may be used e.g. single or double sided ring or plate, disc, etc. or the electric fusion heater wire can simply be molded into one end face of a pipe part.

Alternatively, the flanges can have grooves or recesses formed in them to receive the heating element so that it is entirely contained and sealed within the flanges when they are formed together.

Optionally during fusion, the flanges can be clamped e.g. with split backing rings 18 which are spring loaded to take up fusion melt movement.

Many other thermoplastic materials can be used in place of MDPE, as will be evident to the skilled artisan.

We claim:

1. An adjustable pipe bend comprising: two relatively movable pipe parts adapted to be set by relative rotation at any angle to each other within a predetermined range; each of said pipe parts having a curved end portion, and a flange extending radially outward from said curved end portion, said curved end portions being provided at a junction of the two pipe parts; and fusion means for fusing the two pipe parts together when they have been set at a desired angle; wherein the flanges on the curved end portions of each pipe part each include a recess located on radially outer portions of said flanges, and said fusion means is located in each of said recesses when the flanges of said two pipe parts are brought together to assist in relative alignment and rotation of said pipe parts, said recesses having a depth such that radially innermost portions of said flanges abut each other from an inner bore of each pipe part to said recesses when said pipe parts are brought together with said fusion means therebetween.

2. A pipe bend according to claim 1 wherein the fusion means comprises an electrical heating element.

3. A pipe bend according to claim 2, wherein the electrical heating element consists of an annular disc of plastics material which has a heated wire at least partially embedded in at least one surface of the disc.

4. A pipe bend according to claim 1, wherein the fusion means comprises a ring, embodying at least one heater wire.

5. A pipe bend according to claim 1, wherein outermost portions of each flange abut each other when said pipe parts are brought together so that the heating element is entirely contained and sealed within the flanges when they are brought together.

6. A pipe bend according to claim 1, further comprising means for clamping the pipe parts together under spring loading during fusion to take up fusion melt movement.

7. An adjustable pipe bend according to claim 1, further comprising an additional pipe section between the two relatively movable pipe parts so as to provide a full 90 degrees adjustable bend.

* * * * *